US011734762B2

(12) United States Patent
Buehler et al.

(10) Patent No.: US 11,734,762 B2
(45) Date of Patent: Aug. 22, 2023

(54) METHOD AND SYSTEM FOR MANAGING DERIVATIVES PORTFOLIOS

(71) Applicant: JPMorgan Chase Bank, N.A., New York, NY (US)

(72) Inventors: Hans Buehler, London (GB); Louis-Andre Moussu, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 236 days.

(21) Appl. No.: 16/749,128

(22) Filed: Jan. 22, 2020

(65) Prior Publication Data

US 2021/0224911 A1  Jul. 22, 2021

(51) Int. Cl.
*G06Q 40/06* (2012.01)
*G06Q 30/0201* (2023.01)
*G06Q 40/04* (2012.01)

(52) U.S. Cl.
CPC ......... *G06Q 40/06* (2013.01); *G06Q 30/0201* (2013.01); *G06Q 40/04* (2013.01)

(58) Field of Classification Search
CPC .... G06Q 40/06; G06Q 30/0201; G06Q 40/04; G06Q 40/00
See application file for complete search history.

(56) References Cited

U.S. PATENT DOCUMENTS

| | | | |
|---|---|---|---|
| 7,389,262 B1 | 6/2008 | Lange | |
| 8,190,503 B2 | 5/2012 | Green et al. | |
| 2005/0090911 A1* | 4/2005 | Ingargiola | G06Q 40/06 700/47 |
| 2006/0059065 A1 | 3/2006 | Glinberg et al. | |
| 2008/0091585 A1* | 4/2008 | MacQueen | G06Q 40/04 705/36 R |
| 2010/0131427 A1* | 5/2010 | Monroe | G06Q 40/06 705/36 R |

(Continued)

FOREIGN PATENT DOCUMENTS

WO   WO-0103046 A1 *  1/2001  ............. G06Q 40/06

OTHER PUBLICATIONS

Nuti et al. "Algorithmic Trading" UK Centre in Financial Computing, London. IEEE Computer Society. Nov. 2011 (Year: 2011).*

(Continued)

*Primary Examiner* — Elda G Milef
(74) *Attorney, Agent, or Firm* — Greenblum & Bernstein, P. L. C.

(57) ABSTRACT

A method and a computing apparatus for managing a portfolio of securities and derivatives are provided. The method includes: identifying a plurality of potential trades based on the portfolio of securities and derivatives; obtaining historical market data that relates to the identified plurality of potential trades; assessing a respective optimal value of each of the at least one security that relates to a corresponding one of the potential trades; and determining trades to be executed from among the identified plurality of potential trades. The assessments of the respective optimal values are based on the obtained historical market data, and also on additional information that relates to each security, using statistical methods. The determination of trades to be executed is based on the corresponding optimal values.

22 Claims, 4 Drawing Sheets

(56) References Cited

U.S. PATENT DOCUMENTS

| | | | | |
|---|---|---|---|---|
| 2014/0136446 A1* | 5/2014 | Golan | ................... | G06Q 40/06 |
| | | | | 705/36 R |
| 2015/0095264 A1* | 4/2015 | Williams | ............... | G06Q 40/06 |
| | | | | 705/36 R |
| 2018/0114269 A1* | 4/2018 | Kuck | ...................... | A63F 13/25 |
| 2018/0315125 A1* | 11/2018 | Zheng | ................... | G06F 16/00 |
| 2020/0311723 A1* | 10/2020 | Miller | ................... | G06Q 40/04 |

OTHER PUBLICATIONS

Y. Deng, F. Bao, Y. Kong, Z. Ren and Q. Dai, "Deep Direct Reinforcement Learning for Financial Signal Representation and Trading," in IEEE Transactions on Neural Networks and Learning Systems, vol. 28, No. 3, pp. 653-664, Mar. 2017 (Year: 2017).*
International Search Report and Written Opinion in corresponding International Application No. PCT/US21/13945, dated Apr. 9, 2021.

* cited by examiner

METHOD AND SYSTEM FOR MANAGING DERIVATIVES PORTFOLIOS

BACKGROUND

1. Field of the Disclosure

This technology generally relates to methods and systems for managing a portfolio of securities and derivatives, and more particularly, to methods and systems for using a data-driven approach to assess price, inventory, risk, and additional information to make determinations regarding potential trades in connection with managing a portfolio of securities and derivatives.

2. Background Information

Conventional financial inventory management of securities and derivatives typically relies on classic quantitative finance methods and individual analysts to make decisions about trading strategies as such methods do not account for frictions (i.e., costs) or restrictions (e.g., trading limits or liquidity constraints).

In an environment in which data availability and computation power is scarce, such an approach may be understandable. However, in the current environment, in which data availability and computation power are more plentiful, there is a need for a data-driven statistical framework for scalable decision making in financial inventory management. Further, when such a portfolio includes derivatives and/or other relatively complex types of financial instruments, the need for such a data-driven framework becomes more pronounced due to the complexity of these financial instruments.

SUMMARY

The present disclosure, through one or more of its various aspects, embodiments, and/or specific features or sub-components, provides, inter alia, various systems, servers, devices, methods, media, programs, and platforms for using a data-driven approach to assess price, inventory, risk, and additional information to make determinations regarding potential trades in connection with managing a derivatives portfolio.

According to an aspect of the present disclosure, a method for managing a portfolio of securities and derivatives is provided. The method is implemented by at least one processor. The method includes: identifying, by the at least one processor, a plurality of available hedging instruments based on the portfolio of securities and derivatives, each of the available hedging instruments relating to at least one security included in the portfolio of securities and derivatives; obtaining, by the at least one processor, historical market data that relates to the identified plurality of hedging instruments; assessing, by the at least one processor, an optimized value of the portfolio of securities and derivatives based on the obtained historical market data; and determining, by the at least one processor, at least one potential action to be executed with respect to the plurality of available hedging instruments based on the assessed optimized value.

The assessing the optimized value of the portfolio of securities and derivatives may include generating a market model simulation function based on the portfolio of securities and derivatives and maximizing a value of the generated market model simulation function, or using playback of historic data to the same end.

The market model simulation function may be based on a finite dimensional Linear Markov Representation (LMR) of the portfolio of securities and derivatives.

The generating the market model simulation function may include training the market model simulation function based on the obtained historical market data.

The assessing the optimized value of the portfolio of securities and derivatives may include evaluating an entropy of a future cash flow as a function of a risk aversion parameter and maximizing the value of the generated market model simulation function based at least in part on the evaluated risk-adjusted value.

The method may further include obtaining, by the at least one processor, trade, additional, or other information that relates to a first security included in the portfolio of securities and derivatives. The assessing the optimized risk-adjusted value of the portfolio of securities and derivatives may be based on the obtained historical market data and the obtained additional information.

The determining the at least one potential action to be executed may be based at least in part on at least one trading restriction.

The at least one trading restriction may include at least one of a risk limit based on a current portfolio exposure, a liquidity restriction, and a regulatory constraint.

The determining the at least one potential action to be executed may be based at least in part on a transaction cost.

The plurality of hedging instruments may include at least one hedging instrument that relates to a derivative for which no market price is publicly available.

According to another aspect of the present disclosure, a computing apparatus for managing a portfolio of securities and derivatives is provided. The computing apparatus includes a processor, a memory, and a communication interface coupled to each of the processor and the memory. The processor is configured to: identify a plurality of available hedging instruments based on the portfolio of securities and derivatives; obtain historical market data that relates to the identified plurality of hedging instruments; assess an optimized value of the portfolio of securities and derivatives based on the obtained historical and additional market data; and determine at least one potential action to be executed with respect to the plurality of available hedging instruments based on the assessed optimized value.

The processor may be further configured to assess the optimized value of the portfolio of securities and derivatives by generating a market model simulation function based on the portfolio of securities and derivatives and maximizing a value of the generated market model simulation function.

The market model simulation function may be based on a finite dimensional Linear Markov Representation (LMR) of the portfolio of securities and derivatives.

The processor may be further configured to train the market model simulation function based on the obtained historical market data.

The processor may be further configured to assess the optimized value of the portfolio of securities and derivatives by evaluating an entropy of a future cash flow as a function of a risk aversion parameter and maximizing the value of the generated market model simulation function based at least in part on the evaluated entropy.

The processor may be further configured to obtain additional information that relates to a first security included in the portfolio of securities and derivatives, and to assess the optimized risk-adjusted value of the portfolio of securities and derivatives based on the obtained historical market data and the obtained additional information.

The processor may be further configured to determine the at least one potential action to be executed based at least in part on at least one trading restriction.

The at least one trading restriction may include at least one of a risk limit based on a current portfolio exposure, a liquidity restriction, and a regulatory constraint.

The processor may be further configured to determine the at least one potential action to be executed based at least in part on a transaction cost.

The plurality of hedging instruments may include at least one hedging instrument that relates to a derivative for which no market price is publicly available.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
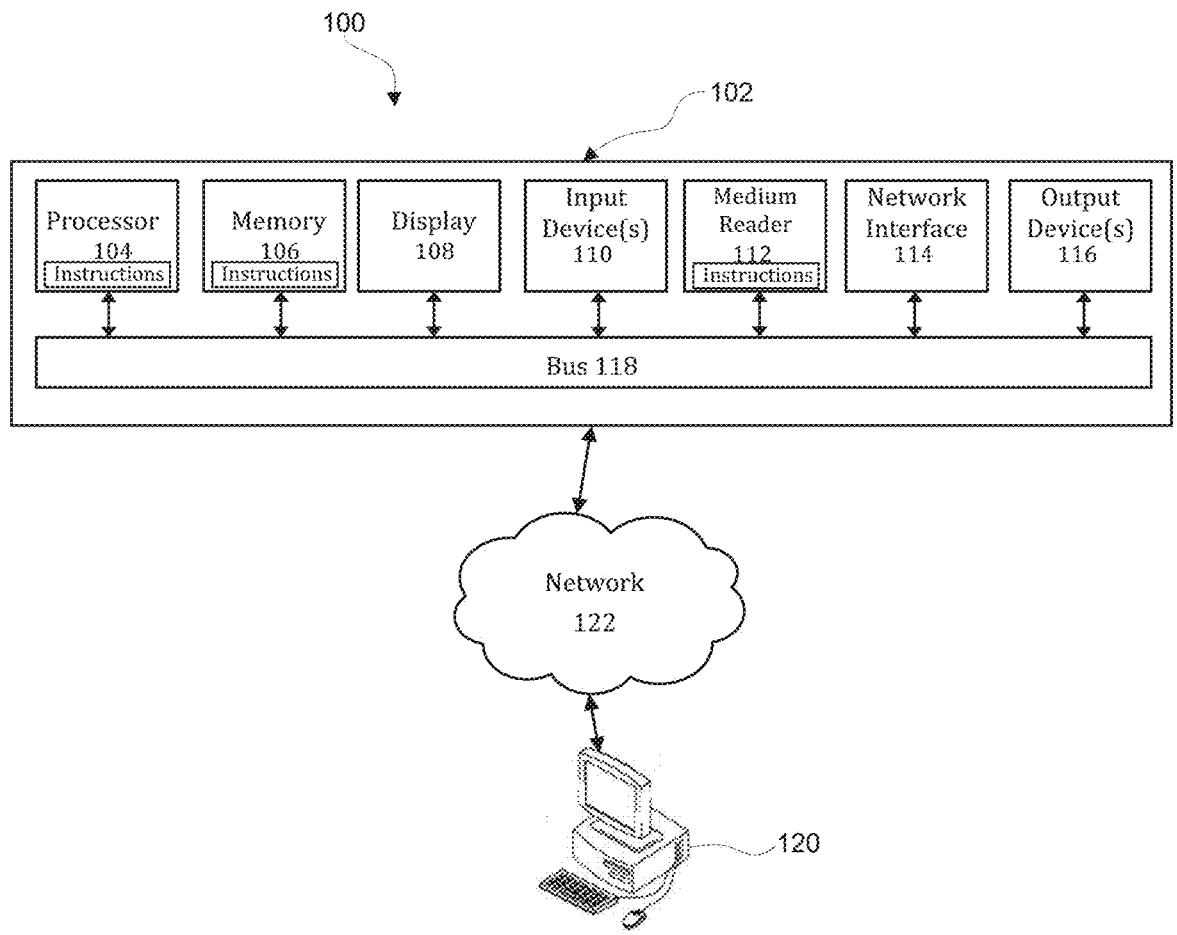
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for using a data-driven approach to assess price, inventory, risk, and additional information to make determinations regarding potential trades in connection with managing a derivatives portfolio.

Figure 2:
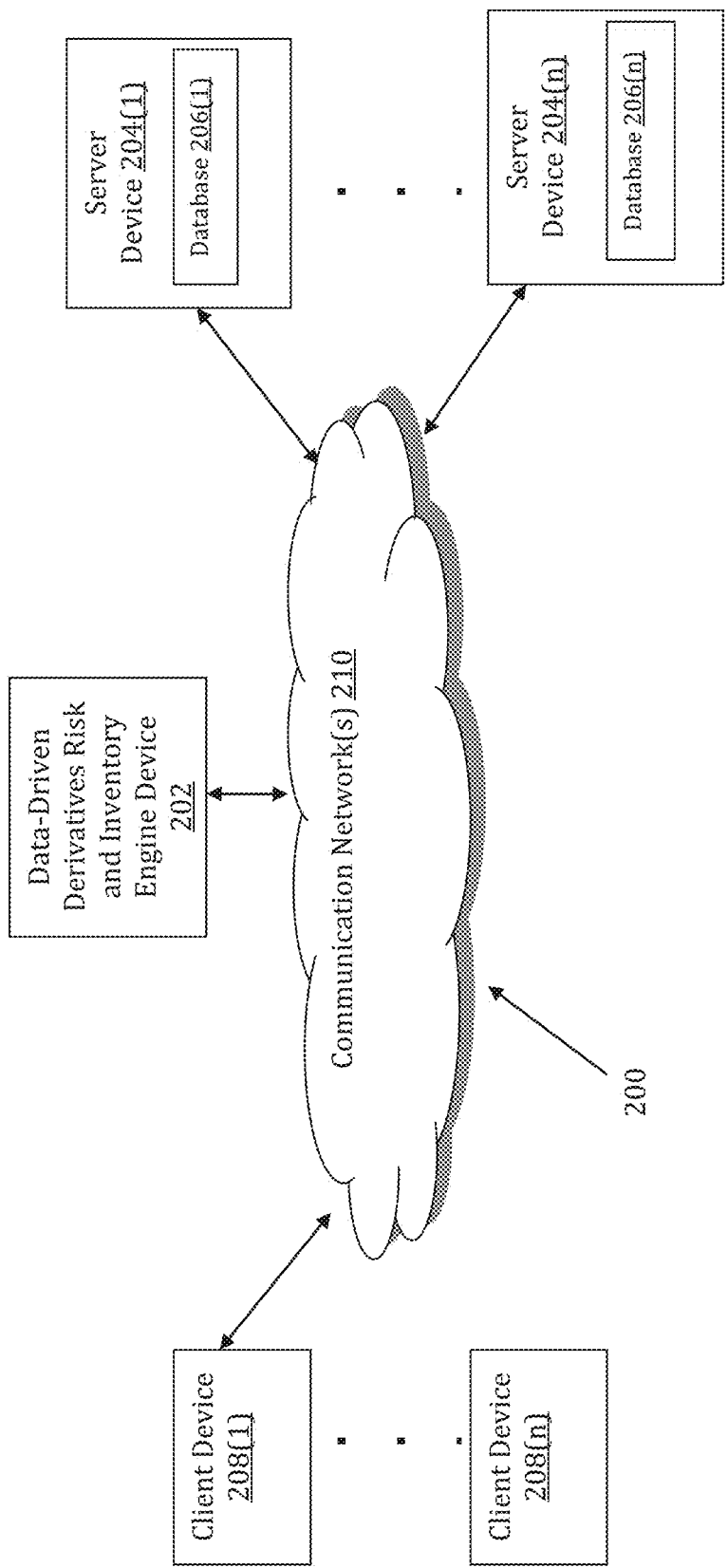
FIG. 2 illustrates an exemplary diagram of a network environment.

Referring to FIG. 2, a schematic of an exemplary network environment 200 for implementing a method for using a data-driven approach to assess price, inventory, risk, and additional information to make determinations regarding potential trades in connection with managing a derivatives portfolio is illustrated. In an exemplary embodiment, the method is executable on any networked computer platform, such as, for example, a personal computer (PC).

The method for using a data-driven approach to assess price, inventory, risk, and additional information to make determinations regarding potential trades in connection with managing a derivatives portfolio may be implemented by a Data-Driven Derivatives Risk and Inventory Engine (DDRIVE) device 202. The DDRIVE device 202 may be the same or similar to the computer system 102 as described with respect to FIG. 1. The DDRIVE device 202 may store one or more applications that can include executable instructions that, when executed by the DDRIVE device 202, cause the DDRIVE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DDRIVE device 202 itself, may be located in virtual server(s) running in a cloud-based computing environment rather than being tied to one or more specific physical network computing devices. Also, the application(s) may be running in one or more virtual machines (VMs) executing on the DDRIVE device 202. Additionally, in one or more embodiments of this technology, virtual machine(s) running on the DDRIVE device 202 may be managed or supervised by a hypervisor.

In the network environment 200 of FIG. 2, the DDRIVE device 202 is coupled to a plurality of server devices 204(1)-204(n) that hosts a plurality of databases 206(1)-206(n), and also to a plurality of client devices 208(1)-208(n) via communication network(s) 210. A communication interface of the DDRIVE device 202, such as the network interface 114 of the computer system 102 of FIG. 1, operatively couples and communicates between the DDRIVE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DDRIVE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DDRIVE devices that efficiently implement a method for using a data-driven approach to assess price, inventory, risk, and additional information to make determinations regarding potential trades in connection with managing a derivatives portfolio.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DDRIVE device 202 may be a standalone device or integrated with one or more other devices or apparatuses, such as one or more of the server devices 204(1)-204(n), for example. In one particular example, the DDRIVE device 202 may include or be hosted by one of the server devices 204(1)-204(n), and other arrangements are also possible. Moreover, one or more of the devices of the DDRIVE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(l)-204(n) may include, among other features, one or more processors, a memory, and a communication interface, which are coupled together by a bus or other communication link, although other numbers and/or types of network devices may be used. The server devices 204(1)-204(n) in this example may process requests received from the DDRIVE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical market data, such as price data for individual securities and/or market indexes, and portfolio management data, which includes data that relates to securities, bonds, derivatives, and hedging instruments that are included in a portfolio of a particular investor.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DDRIVE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DDRIVE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DDRIVE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DDRIVE device 202, the server devices 204(1)-204(n), or the client devices 208(l)-208(n), for example, may be configured to operate as virtual instances on the same physical machine. In other words, one or more of the DDRIVE device 202, the server devices 204(1)-204(n), or the client devices 208(1)-208(n) may operate on the same physical device rather than as separate devices communicating through communication network(s) 210. Additionally, there may be more or fewer DDRIVE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
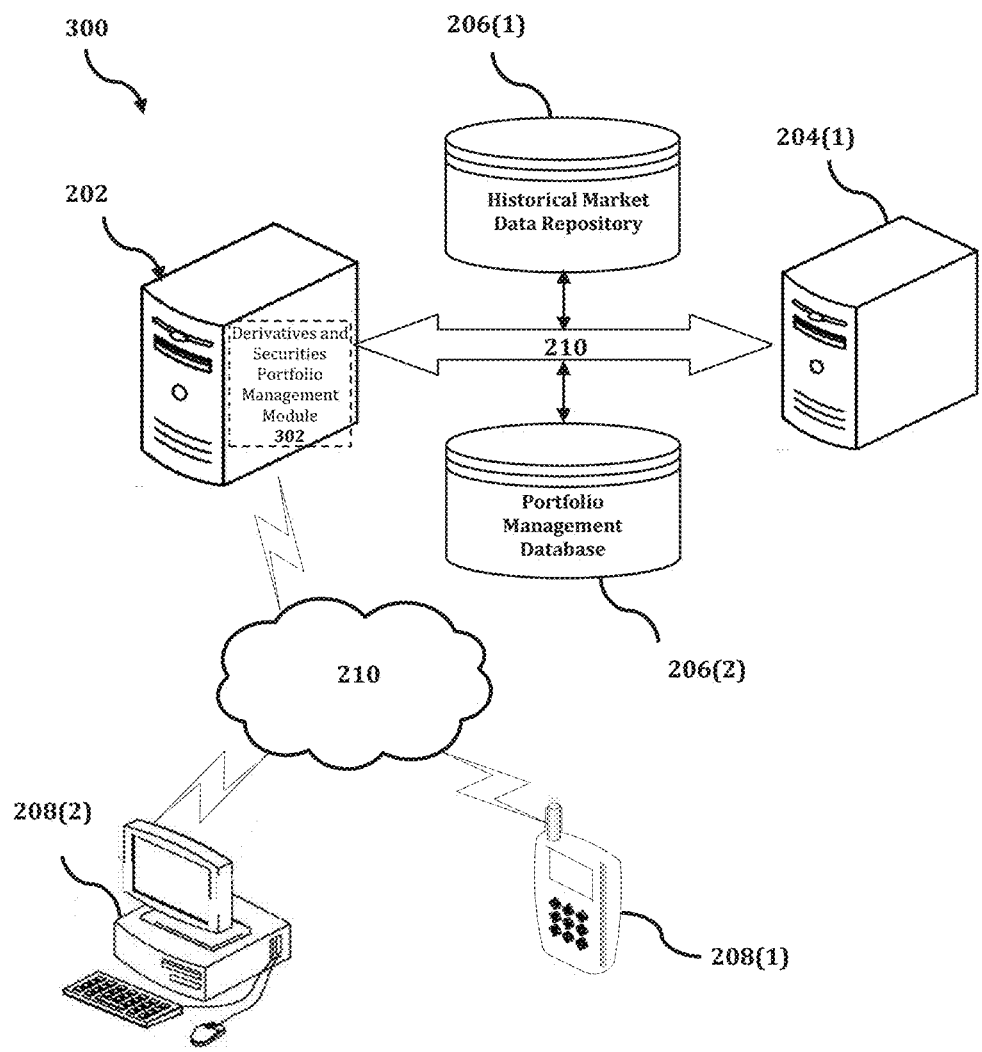
FIG. 3 shows an exemplary system for implementing a method for using a data-driven approach to assess price, inventory, risk, and additional information to make determinations regarding potential trades in connection with managing a derivatives portfolio.

The DDRIVE device 202 is described and shown in FIG. 3 as including a derivatives and securities portfolio management module 302, although it may include other rules, policies, modules, databases, or applications, for example. As will be described below, the derivatives portfolio management module 302 is configured to implement a method for using a data-driven approach to assess price, inventory, risk, and additional information to make determinations regarding potential trades in connection with managing a derivatives and securities portfolio in an automated, efficient, scalable, and reliable manner.

An exemplary process 300 for implementing a method for using a data-driven approach to assess price, inventory, risk, and additional information to make determinations regarding potential trades in connection with managing a derivatives and securities portfolio by utilizing the network environment of FIG. 2 is shown as being executed in FIG. 3. Specifically, a first client device 208(1) and a second client device 208(2) are illustrated as being in communication with DDRIVE device 202. In this regard, the first client device 208(1) and the second client device 208(2) may be "clients" of the DDRIVE device 202 and are described herein as such. Nevertheless, it is to be known and understood that the first client device 208(1) and/or the second client device 208(2) need not necessarily be "clients" of the DDRIVE device 202, or any entity described in association therewith herein. Any additional or alternative relationship may exist between either or both of the first client device 208(1) and the second client device 208(2) and the DDRIVE device 202, or no relationship may exist.

Further, DDRIVE device 202 is illustrated as being able to access a historical market data repository 206(1) and an individual portfolio management database 206(2). The derivatives portfolio management module 302 may be configured to access these databases for implementing a method for using a data-driven approach to assess price, inventory, risk, and additional information to make determinations regarding potential trades in connection with managing a derivatives and securities portfolio.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DDRIVE device 202 via broadband or cellular communication. Of course, these embodiments are merely exemplary and are not limiting or exhaustive.

Upon being started, the derivatives and securities portfolio management module 302 executes a process for using a data-driven approach to assess price, inventory, risk, and additional information to make determinations regarding potential trades in connection with managing a derivatives and securities portfolio. An exemplary process for using a data-driven approach to assess price, inventory, risk, and additional information to make determinations regarding potential trades in connection with managing a derivatives and securities portfolio is generally indicated at flowchart 400 in FIG. 4.

Figure 4:
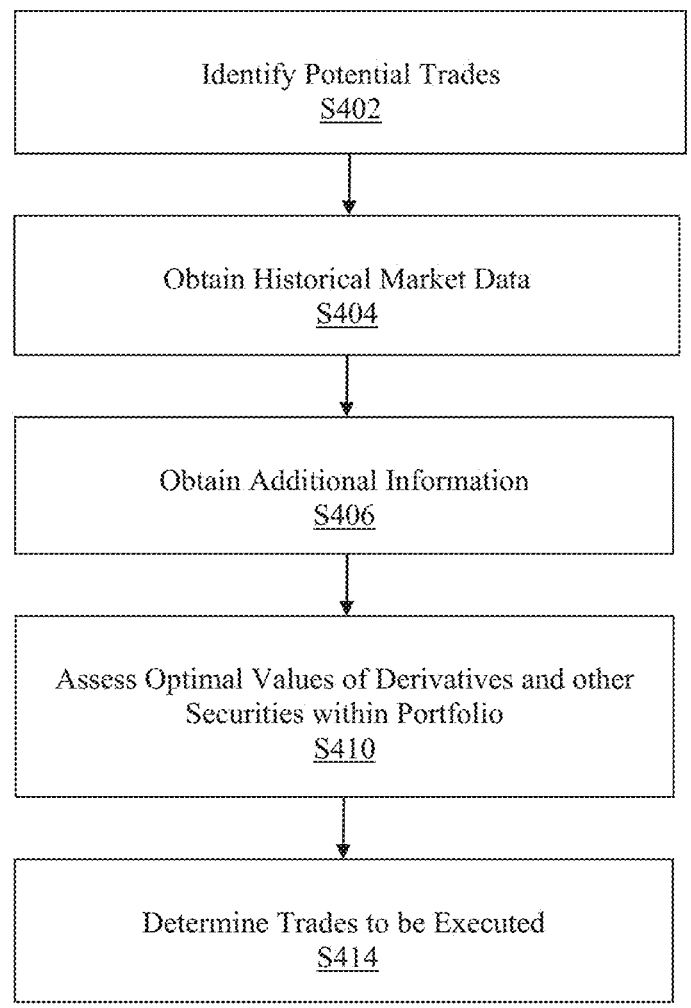
FIG. 4 is a flowchart of an exemplary process for implementing a method for using a data-driven approach to assess price, inventory, risk, and additional information to make determinations regarding potential trades in connection with managing a derivatives portfolio.

In the process 400 of FIG. 4, at step S402, the derivatives and securities portfolio management module 302 identifies potential trades with respect to a particular portfolio of securities and derivatives. In an exemplary embodiment, the potential trades may relate to derivatives and/or other complex financial instruments, such as futures, options and swaps. However, the portfolio of securities and derivatives may also include any other type of security or financial instrument. Thus, for example, the potential trades may relate to any one or more of a share of a stock, a convertible bond, and/or a bond.

At step S404, the derivatives and securities portfolio management module 302 obtains historical market data. In an exemplary embodiment, the historical market data may include pricing data for the list of S&P 500 companies. The list of S&P 500 companies includes common stocks that are issued by large-capitalization companies and are actively traded on American stock exchanges. In an exemplary embodiment, the historical market data may be updated at any time, such as, for example, on a regular periodic basis based on a predetermined interval and/or whenever a change occurs in the content of the portfolio.

At step S406, the derivatives and securities portfolio management module 302 obtains additional information that relates to one or more of the derivatives, securities, and financial instruments that reside in the portfolio and that have been identified as being involved in a potential trade. In an exemplary embodiment, the additional information may include news information that relates to current events and/or recent activities that relate to a portion of the portfolio.

At step S408, the derivatives and securities portfolio management module 302 assesses optimal values of the derivatives and other securities within the portfolio based on the historical market data and the obtained additional information. Then, at step S410, the derivatives and securities portfolio management module 302 determines trades to be executed from among the set of identified potential trades, based on the assessed optimal values of the derivatives and other securities within the portfolio. In an exemplary embodiment, the individual portfolio management database 206(2) may have stored therein information that relates to trading restrictions that relate to the portfolio, such as, for example, a risk limit based on a current portfolio exposure, a liquidity restriction, and/or a regulatory restraint. Thus, the determination of trades to be executed may be based in part on any such trading restriction.

In an exemplary embodiment, the derivatives and securities portfolio management module 302 may implement an automated process for managing derivatives and securities portfolios that includes pricing client trades; managing inventory and risk; and electronic execution with trading algorithms. In an exemplary embodiment, the pricing of client trades may entail pricing to optimize revenue and/or using volatility marking, expected trading costs, trade difficulty, position carry, and contribution to risk. In an exemplary embodiment, the managing of inventory and risk may entail optimizing the derivatives and securities portfolio continuously by maximizing carry and controlling risk by finding robust hedges and mitigating trading costs, and/or capturing trading opportunities based on medium term volume fair value. In an exemplary embodiment, the electronic execution with trading algorithms may entail using low latency algorithms trading continuously in order to implement optimizer solutions and/or capturing short term opportunities within risk constraints.

In an exemplary embodiment, the process for managing derivatives and securities portfolios may run at regular time intervals and on significant events, such as a portfolio change, a market move, and/or a client trade. The process may perform several tasks, including, for example, a screen portfolio task that entails a computation of an expected carry and risks for the portfolio, with breakdown per asset and per buckets of maturities and strikes. The risks may include, for example, portfolio sensitivities (e.g., Delta, Vega, Gamma, Vega Skew/Termstructure, Scenario Risks, etc.) and/or statistical risk with respect to a particular market environment.

In an exemplary embodiment, the process may also perform a task that relates to portfolio maximizing. In particular, given a maximum risk level ρ (relative to a current level, i.e., 100% means that the risk remains the same), the process may propose a portfolio maximizing the expected carry minus the trading costs, under the constraints that all risk metrics (i.e., sensitivities and statistical risk) are below their original level times p. Specific values of p may be selected per risk metric, and sensitivity targets may be overridden.

In an exemplary embodiment, the process may also perform a task that relates to pricing new trades based on an impact to an expected profit-and-loss parameter for the portfolio after reoptimization of the portfolio.

In an exemplary embodiment, the process performs these tasks by making use of the extensive available data. Historical stock, futures, and options market data includes a relatively large data set, as there may be approximately 1000 listed options on an SX5E index on any given day, and historical profit-and-loss values may be computed across options over various time horizons. This data may then be used to learn what are the expected carry and statistical risk of any portfolio given the market conditions (i.e., current volatility surface, recent option profit-and-loss values, and spot returns, etc.), which are then used to optimize the portfolio.

In an exemplary embodiment, the process implements a machine learning problem that may be addressed via deep learning. The approach is powerful because: it does not rely on classic structural assumptions, but instead uses historical option profit-and-loss (P&L) values; it is based on real option profit-and-loss values, and therefore, it captures all real effects (e.g., carry of skew positions and empirical volume dynamics) that are not captured by naïve realized/implied volume based signals; and considering option profit-and-loss values over longer time horizons allows for capturing risk dynamics, such as pin risk for options that will expire relatively soon, and thus, portfolio risks are more robustly understood.

In an exemplary embodiment, the process uses an option portfolio for which an objective is to optimize $$\{(q_i, T_i, K_i)\}_{i=1, \ldots, m}$$

where $q_i$, $T_i$, and $K_i$ are respectively the quantity, maturity and strike of the option i. Additional options $\{(T_i, K_i)\}_{i=m+1, \ldots, n}$ which can be used to hedge the portfolio are also introduced. It is noted that Xx refers to the value of option i at time t. If $K_i$ is zero, the instrument refers to the forward until $T_i$. If in addition $T_i$ is zero, then the instrument refers to the index or stock spot value. The EMEA Index Flow SX5E book, which contains about 3000 options on SX5E Index, may be used as an example.

In an exemplary embodiment, managing the portfolio involves finding a balance between maximizing carry and minimizing risks and trading costs. Particular attention may be given to the statistical risk of the portfolio and the use of risk metrics relevant to derivatives. The portfolio may be optimized over a certain time horizon in order to find robust and durable hedges and also to better account for the carry of the position.

Hence, it is noted that $\delta X_t^i(\tau)$, i.e., the profit-and-loss value of option, stock or future i over a given time horizon T and delta hedged every day, may be expressed as follows:

$$\delta X_t^i(\tau) = X_{t+\tau}^i - X_t^i - \sum_{u=1}^{\tau} \Delta_{t+u-i}^i \delta S_{t+u}^i$$

The P&L of the portfolio over the time horizon T may be expressed as follows:

$$\delta P_t(\tau) - \sum_{i=1}^{n} q_i \delta X_t^i(\tau)$$

An objective may be to maximize the expected P&L of the portfolio over the chosen time horizon, while penalizing for the portfolio risk. This objective may be achieved by finding a hedging portfolio w maximizing the following expression:

$$f(w) = E\left(\delta P_t\{\tau\} - \sum_{i=1}^{n} w_i \delta X_t^i(\tau) \middle| \mathcal{F}_t\right) - c(w) - \lambda E\left(h\left(\delta P_t(\tau) - \sum_{i=1}^{n} w_i \delta X_t^i(\tau)\right) \middle| F_t\right)$$

where $E(\ldots \| \mathcal{F}_t)$ is the expected P&L conditionally to all current and past market conditions;

$E(h(\ldots) | \mathcal{F}_t)$ is a term penalizing the risk, for example: $h(x)=x^2$ or $h(x)=\min(x,0)^2$, which may be understood as a statistical risk metric; the term c(w) is the cost of trading w; and this objective is subject to a number of constraints, including overall sensitivity constraints, per bucket sensitivity constraints, and a risk constraint $$E\left(h\left(\delta P_t(\tau) - \sum_{i=1}^{n} w_i \delta X_t^i(\tau)\right) \middle| \mathcal{F}_t\right) < \hat{h}.$$

In an exemplary embodiment, the process may include constraints on the portfolio sensitivities. The constraints may include: Lower and upper bounds on all standard sensitivities of the portfolio (after hedge): $\phi^L < (q-w)\phi < \phi^U$, where $\phi$ is a matrix containing all the option sensitivities, i.e., Theta, Gamma, Vega, various forms of Vega exposure (e.g., skew, term structure); Tier Scenarios; and maximum gross sensitivities traded $|w\phi| < \phi^G$.

In an exemplary embodiment, in order to obtain a more granular control of the portfolio, constraints per buckets may also be included. The constraints per bucket may be defined as follows: Given series of strikes $K_0, \ldots, K_{n_K}$ (practically expressed in delta $\Delta_0, \ldots, \Delta_{n_K}$) and maturities $T_0, \ldots, T_{n_T}$, the buckets may be defined in accordance with the following expression:

$B_{i,j} = ]K_{i-1}, K_i] \times ]T_{j-1}, T_j]$

Further, for each bucket, there are maximum sensitivities, which may be expressed as follows:

$|\Sigma_{ij(K_i,T_i) \in B_{i,j}}(q_i - w_i)\phi_i| < \phi_{i,j}^B$

Finally, a constraint on the statistical risk may be expressed as follows:

$$E\left(h\left(\delta P_t(\tau) - \sum_{i=1}^{n} w_i \delta X_t^i(\tau)\right) \middle| \mathcal{F}_t\right) < \bar{h}$$

where any of the following expressions for h may be used:
1. $h(x)=|x|$
2. $h(x)=x^2$
3. $h(x)=-\min(x,0)$, or $h(x)=-\min(x+k,0)$
4. $h(x)=\min(x,0)^2$ In an exemplary embodiment, functions (1) and (2) above treat gain and losses equally and (2) will comparatively emphasize large P&Ls. In contrast, functions (3) and (4) consider only losses, which is advisable for the asymmetrical P&L distributions produced by options. In this aspect, although it may seem redundant to have the statistical risk appearing both in the objective function and as a constraint, it may actually be useful, because using the constraint guarantees that the portfolio will have a risk below a certain level while adding the risk in the objective function incentivizes the optimizer to reduce it even when the constraint is satisfied.

In an exemplary embodiment, more than one risk constraint may be used at the same time with different risk functions. For example, using constraints on $h(x)=-\min(x,0)$ and $h(x)=-\min(x+k,0)$ at the same time may be useful in order to control both the average risk and the extreme risk. As a practical matter, the constraints levels will be inputted relatively to their original level via a parameter $\rho$ (for which 100% corresponds to all of the risks remaining unchanged).

In an exemplary embodiment, the cost of trading may be modelled as expressed below:

$$c(w) = \sum_{i=1}^{n} h(w_i, vega_i, spread_i, vol_i)$$

where $vega_i$, $spread_i$ and $vol_i$ are respectively the Vega, average spread and average daily volume of option i and $$h(w, v, s, V) = \frac{1}{2} s|wv|\left(1 + \kappa \frac{|wv|}{v}\right).$$

The point of the term $$\kappa \frac{|wv|}{v}$$

is to make the cost in vol points increase with the amount of Vega traded.

In an exemplary embodiment, the following design choices may be made:
1. $h(x)=-\min(x,0)$ in the objective function
2. Both $h(x)=-\min(x,0)$ and $h(x)=-\min(x+k, 0)$ in the constraints
3. $\kappa=0$ in the cost function For these choices, the problem may be solved as a linear one, and it may be understood as an initial implementation. Using the quadratic risk and cost functions defined above is feasible with a quadratic optimizer, and thus, this may be implemented as a second step. As a further step, the approach can be generalized to multi-period hedging using reinforcement learning.

In an exemplary embodiment, one key work lies in modelling the joint distribution of the option P&Ls $\delta X_t(\tau) = (\delta X_t^1(\tau), \ldots, \delta X_t^n(\tau))$, conditionally to the "information known at time t"—which may be conceived as a variable $M_t$ aggregating the relevant explanatory variables known at the time. This conditional distribution may be estimated by using machine learning, after building a data set according to the following criteria: First, for a given timeline $t_1, \ldots, t_N$ (e.g., weekly), the historical P&Ls of delta hedged options $\delta X_{t_1}(\tau), \ldots, \delta X_{t_N}(\tau)$ may be computed, and the explanatory variables $M_{t_1}, \ldots, M_{t_N}$ are stacked over the timeline. Second, the options used at every time $t_1, \ldots, t_N$ may be chosen to have the same moneyness (or delta) and tenors (i.e., relative maturities) as the ones constituting the current portfolio and hedging set, in order to allow for consideration of options in the past with properties at the time equivalent to these of the options in the current portfolio.

In an exemplary embodiment, computing the expected P&L of the portfolio $$E\left(\delta P_t(\tau) - \sum_{i=1}^n w_i \delta X_t^i(\tau) \middle| M_t\right)$$

only requires to know the individual expectations $E(\delta\lambda_t^i(\tau)|M_t)$, whereas the risk term $$E\left(h\left(\delta P_t(\tau) - \sum_{i=1}^n w_i \delta X_t^i(\tau)\right) \middle| M_t\right)$$

requires knowledge of the whole distribution in most cases. However, estimating the expected P&L may be a more difficult task, because the option risks and the dependency structure between options are stable features, unlike the elusive "alpha" which may require more explanatory variables.

In an exemplary embodiment, in order to compute the risk term, the historical distribution $\delta X_{t_1}(\tau), \ldots, \delta X_{t_N}(\tau)$ may be used. However, many of these historical P&Ls occurred in very different volatility regimes, and it is desirable to take this into account. One way of doing this is to give different probabilities to each of the historical samples, based on the distance between the current market environment and the one prevailing at the time. For example, this may be achieved by using the implied volatility surface to characterize the market environment in accordance with the following expression:

$$p_i(\Sigma) = \alpha K(\|\Sigma - \Sigma_{t_{ir}}\|_2)$$

where K is a typical Kernel function. For this class of model, adding less relevant variables only increases the estimation variance; hence only the implied volatility surface will be used as an explanatory variable in this example.

In an exemplary embodiment, for the expected P&L, the task is to estimate the $E(\delta X_t^i(\tau)|M_t)$, where $M_t$ contains all the information which can yield some forecasting power. For example,
Current implied volatility surfaces $\{\Sigma_t(T,K)\}_{T,K}$; the lagged implied volatility surfaces $\{\Sigma_{t-Lags}(T,K)\}_{T,K}$ may also be included;
Recent spot returns;
Recent option P&Ls $\delta X_{t-Lags}^i(\tau)$; and
For stocks only: earning dates.

In an exemplary embodiment, the following features are captured: persistency of the carry as a function of strike and maturity (i.e., skew carry); influence of volatility level, term structure and skew on the carry per strike and maturity; and typical volatility dynamics, such as mean reversion of volume level, skew and term structure, skew ride, curve slides, level resets after spot trends, and influence of regimes stressed/un-stressed. In an exemplary embodiment, the modelling may be performed via machine learning techniques, such as deep learning.

In an exemplary embodiment, client trades should be priced in order to optimize revenue. There are different aspects to consider, including the following: trades with higher execution costs should be priced higher, trades increasing the portfolio expected P&L or decreasing its risk can be priced more competitively; and the higher the margin, the less likely the trade. One way to establish the price is to compute the impact of trade on the expected P&L of the portfolio after re-hedging, based on a condition that imposing that the portfolio risk can only be lower than its pre-trade level. A simpler approach would be to combine the expected trading cost with the expected trade difficulty, with a potential discount depending on the contribution to risk.

This first step gives a lower bound for the price to which a margin can be added. The margin should be determined in order to optimize the expected revenue. This requires having an estimate of the probability of trading with clients as a function of the price, which could be estimated from the record of traded/nontraded requests.

Accordingly, with this technology, an optimized process for implementing methods and systems for using a data-driven approach to assess price, inventory, risk, and additional information to make determinations regarding potential trades in connection with managing a derivatives and securities portfolio is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for accessing data stored in a data repository and a management database and using the accessed data to perform identifying, obtaining, assessing, and determining operations, the method comprising:

performing communications over a communication network between a historical market data repository and a network interface of a derivatives and securities portfolio management module of a Data-Driven Derivatives Risk and Inventory Engine device having at least one processor;

performing communications over the communication network between a portfolio management database and the network interface of the derivatives and securities portfolio management module of the Data-Driven Derivatives Risk and Inventory Engine device;

accessing historical market data including price data for individual securities and market indexes stored in the historical market data repository with the derivatives and securities portfolio management module of the Data-Driven Derivatives Risk and Inventory Engine device;

accessing portfolio management data that includes data relating to securities, bonds, derivatives, and hedging instruments that are included in a portfolio stored in the portfolio management database with the derivatives and securities portfolio management module of the Data-Driven Derivatives Risk and Inventory Engine device;

identifying, by the derivatives and securities portfolio management module of the Data-Driven Derivatives Risk and Inventory Engine device, a plurality of potential trades based on the portfolio of securities and derivatives stored in the portfolio management database;

obtaining, by the derivatives and securities portfolio management module of the Data-Driven Derivatives Risk and Inventory Engine device, historical market data that relates to the identified plurality of potential trades stored in the historical market data repository;

assessing, by the derivatives and securities portfolio management module of the Data-Driven Derivatives Risk and Inventory Engine device, a respective optimal value of each of at least one security that relates to a corresponding one of the potential trades for a current portfolio;

determining, by the derivatives and securities portfolio management module of the Data-Driven Derivatives Risk and Inventory Engine device, at least one potential trade from among the identified plurality of potential trades based on the corresponding optimal values, wherein the assessing the respective optimal value is performed based on the obtained historical market data stored in the historical market data repository, and wherein the assessing comprises using a machine learning technique to model a joint distribution of profit-and-loss values of the portfolio of securities and derivatives stored in the portfolio management database, and wherein the using of the machine learning technique comprises building a training data set that includes historical profit-and-loss values of delta hedged options for each of a plurality of times from within a predetermined time interval and corresponding aggregate explanatory variables that relate to information known at each of the plurality of times; and building the training data set by
    computing the historical profit-and-loss values of delta hedged options within the predetermined time interval,
    stacking the aggregate explanatory variables over the predetermined time interval,
    selecting the delta hedged options whose profit-and-loss values are used in the training data set to have the same delta and the same relative maturities as the options in the current portfolio and a current hedging set; and
wherein the assessing of the respective optimal value includes assessing a risk-adjusted value of the optimal value by
    computing the historical profit-and-loss values of delta hedged options within a plurality of predetermined time intervals, and
    assigning different probabilities to the historical profit-and-loss values in the plurality of predetermined time intervals, each assigned probability for one of the predetermined time intervals being based on the distance between a current market environment and the market environment prevailing at the one predetermined time interval by using an implied volatility surface to characterize the current market environment and the market environment prevailing at the one of the predetermined time intervals.

2. The method of claim 1, further comprising obtaining, by the at least one processor, additional information that relates to a first security included in the portfolio of securities and derivatives,
    wherein the assessing the respective optimal value of the first security is performed based on the obtained historical market data and the obtained additional information.

3. The method of claim 1, wherein the determining the at least one potential trade is based at least in part on at least one trading restriction.

4. The method of claim 3, wherein the at least one trading restriction includes at least one of a risk limit based on a current portfolio exposure, a liquidity restriction, and a regulatory constraint.

5. The method of claim 1, wherein the determining the at least one potential trade is based at least in part on a transaction cost.

6. The method of claim 1, further comprising executing the determined at least one potential trade.

7. The method of claim 1, further comprising periodically updating the historical market data at a predetermined interval.

8. The method of claim 1, further comprising updating the historical market data whenever a change in a content of the portfolio of securities and derivatives occurs.

9. The method of claim 1, wherein the plurality of potential trades includes at least one potential trade that includes at least one of a future, an option, and a swap.

10. The method of claim 1, wherein the plurality of potential trades includes at least one potential trade that relates to a share of a stock.

11. The method of claim 1, wherein the plurality of potential trades includes at least one potential trade that relates to a convertible bond.

12. A computing apparatus for accessing data stored in a data repository and a management database and using the accessed data to perform identifying, obtaining, assessing, and determining operations, the computing apparatus comprising:

a Data-Driven Derivatives Risk and Inventory Engine device including a derivatives and securities portfolio management module having
    a processor;
    a memory; and
    a communication interface coupled to each of the processor, the memory, and a display screen,
wherein the processor of the derivatives and securities portfolio management module of the Data-Driven Derivatives Risk and Inventory Engine device is configured to:
    perform communications over a communication network via the communication interface with a historical market data repository;
    perform communications over the communication network via the communication interface with a portfolio management database;
    access historical market data including price data for individual securities and market indexes stored in the historical market data repository;
    access portfolio management data that includes data relating to securities, bonds, derivatives, and hedging instruments that are included in a portfolio stored in the portfolio management database;
    identify a plurality of potential trades based on the portfolio of securities and derivatives stored in the portfolio management database;
    obtain historical market data that relates to the identified plurality of potential trades stored in the historical market data repository;
    assess a respective optimal value of each of at least one security that relates to a corresponding one of the potential trades for a current portfolio; and
    determine at least one potential trade from among the identified plurality of potential trades, based on the corresponding optimal values,
wherein the assessment of the respective optimal value is performed based on the obtained historical market data stored in the historical market data repository,
wherein the assessment is performed by using a machine learning technique to model a joint distribution of profit-and-loss values of the portfolio of securities and derivatives stored in the portfolio management database, and wherein the using of the machine learning technique comprises building a training data set that includes historical profit-and-loss values of delta hedged options for each of a plurality of times from within a predetermined time interval and corresponding aggregate explanatory variables that relate to information known at each of the plurality of times; and
    building the training data set by
        computing the historical profit-and-loss values of delta hedged options within the predetermined time interval,
        stacking the aggregate explanatory variables over the predetermined time interval,
        selecting the delta hedged options whose profit-and-loss values are used in the training data set to have the same delta and the same relative maturities as the options in the current portfolio and a current hedging set; and
wherein the assessing of the respective optimal value includes assessing a risk-adjusted value of the optimal value by
    computing the historical profit-and-loss values of delta hedged options within a plurality of predetermined time intervals, and assigning different probabilities to the historical profit-and-loss values in the plurality of predetermined time intervals, each assigned probability for one of the predetermined time intervals being based on the distance between a current market environment and the market environment prevailing at the one predetermined time interval by using an implied volatility surface to characterize the current market environment and the market environment prevailing at the one of the predetermined time intervals.

13. The computing apparatus of claim 12, wherein the processor is further configured to obtain additional information that relates to a first security included in the portfolio of securities and derivatives,
wherein when at least one of the potential trades relates to the first security, the assessment of the respective optimal value of the first security is performed based on the obtained historical market data and the obtained additional information.

14. The computing apparatus of claim 12, wherein the determination of the at least one potential trade is based at least in part on at least one trading restriction.

15. The computing apparatus of claim 14, wherein the at least one trading restriction includes at least one of a risk limit based on a current portfolio exposure, a liquidity restriction, and a regulatory constraint.

16. The computing apparatus of claim 12, wherein the determination of the at least one potential trade is based at least in part on a transaction cost.

17. The computing apparatus of claim 12, wherein the processor is further configured to execute the determined at least one potential trade.

18. The computing apparatus of claim 12, wherein the processor is further configured to periodically update the historical market data at a predetermined interval.

19. The computing apparatus of claim 12, wherein the processor is further configured to update the historical market data whenever a change in a content of the portfolio of securities and derivatives occurs.

20. The computing apparatus of claim 12, wherein the plurality of potential trades includes at least one potential trade that relates to at least one of a future, an option, and a swap.

21. The computing apparatus of claim 12, wherein the plurality of potential trades includes at least one potential trade that relates to a share of a stock.

22. The computing apparatus of claim 12, wherein the plurality of potential trades includes at least one potential trade that relates to a convertible bond.

* * * * *